United States Patent [19]
Radha et al.

[11] Patent Number: 6,049,569
[45] Date of Patent: Apr. 11, 2000

[54] METHOD AND APPARATUS FOR ENCODING DIGITAL VIDEO BIT STREAMS WITH SEAMLESS SPLICE POINTS AND METHOD AND APPARATUS FOR SPLICING SUCH DIGITAL VIDEO BIT STREAMS

[75] Inventors: Hayder Radha, Mahwah, N.J.; Mahesh Balakrishnan, Briarcliff Manor, N.Y.

[73] Assignee: Philips Electronics N.A. Corporation, New York, N.Y.

[21] Appl. No.: 08/987,701

[22] Filed: Dec. 9, 1997

[51] Int. Cl.$^7$ ........................................ H04N 7/32
[52] U.S. Cl. .................... 375/240; 348/415; 348/705; 348/845; 348/845.2; 348/845.3
[58] Field of Search ................... 348/845, 845.2, 348/845.3, 705, 415; 375/240; H04N 7/32

[56] References Cited

U.S. PATENT DOCUMENTS

| | | | |
|---|---|---|---|
| 5,602,592 | 2/1997 | Mori | 348/415 |
| 5,742,347 | 4/1998 | Kandlur | 348/426 |
| 5,754,239 | 5/1998 | Wilkinson | 348/415 |
| 5,982,436 | 11/1999 | Balakrishnan | 348/409 |

OTHER PUBLICATIONS

U.S. Patent application No. 08/829,124.
U.S. Patent Application Titled Video Buffer for Seamless Splicing of MPEG Streams, filed Nov. 25, 1997.

*Primary Examiner*—Howard Britton

[57] ABSTRACT

A method of encoding a digital video bit stream which includes a plurality of successively-encoded pictures. The method includes the steps of constructing a seamless In Point in accordance with a constraint expressed by the following equation (1):

$$dd_{f\_ip} \leq \text{minimum}\{DD_{thr\_ip}, (B_d/r_{n\_ip})\}, \quad (1)$$

where $dd_{f\_ip}$ represents an amount of time by which a first byte of the digital video bit stream after the seamless In Point must stay in a decoder buffer before it is decoded; $B_d$ is a size of the decoder buffer; $r_{n\_ip}$ is a bit rate at which the digital video bit stream is normally encoded at the seamless In Point; and, $DD_{thr\_ip}$ represents a prescribed minimum decoding delay threshold for seamless In Points, where $DD_{thr\_ip}$ is defined by the following equation (2):

$$DD_{thr\_ip} = ((MSR/r_{n\_ip})*SDD) + T_{p\_i}*(1-(MSR/r_{n\_ip})), \quad (2)$$

where $T_{p\_i}$ is a time needed for displaying a picture which starts being displayed at a time of decoding of a last picture prior to the seamless In Point; SDD is a prescribed splice decoding delay; and, MSR is a prescribed maximum splice rate, and then inserting the seamless In Point at a first point in the digital video bit stream at which another digital video bit stream can be spliced into the digital video bit stream. The method also includes the steps of constructing a seamless Out Point in accordance with a constraint expressed by the following equation (3):

$$DD_{thr\_op} \leq dd_{f\_op} \leq (B_d/r_{n\_op}), \quad (3)$$

where $dd_{f\_op}$ represents an amount of time by which a first byte of the digital video bit stream after the seamless Out Point must stay in a decoder buffer before it is decoded; $r_{n\_op}$ is a bit rate at which the digital video bit stream is normally encoded at the seamless Out Point; and $DD_{thr\_op}$ represents a prescribed minimum decoding delay threshold for seamless Out Points, where $DD_{thr\_op}$ is defined by the following equation (4):

$$DD_{thr\_op} = ((MSR/r_{n\_op})*SDD) - T_{p\_o}*((MSR/r_{n\_op})-1), \quad (4)$$

wherein $T_{p\_o}$ is a time needed for displaying a picture which starts being displayed at a time of decoding of a last picture prior to the seamless Out Point; and then inserting the seamless Out Point at a first point in the digital video bit stream at which it can be spliced into another digital video bit stream.

84 Claims, 3 Drawing Sheets

METHOD AND APPARATUS FOR ENCODING DIGITAL VIDEO BIT STREAMS WITH SEAMLESS SPLICE POINTS AND METHOD AND APPARATUS FOR SPLICING SUCH DIGITAL VIDEO BIT STREAMS

This invention was made with United States Government support under Cooperative Agreement No. 70NANBH1174 awarded by the National Institute For Standards and Technology (NIST). The United States Government has certain rights in the invention.

The present invention relates generally to the encoding of digital video signals, and more particularly, to a novel approach to the construction of seamless splice points which minimizes the constraints on the upper and lower bounds of the bit rate which can be used for encoding a digital video bit stream (such as an MPEG-2 compliant video bit stream), to thereby significantly improve the picture quality relative to the presently known technology.

Switching of compressed video streams (i.e., "digital video bit streams") is expected to be an important operation for future television production and distribution services. However, switching of digital video bit streams presents technical challenges that do not exist in current analog-based TV systems. One way of dealing with these challenges is to decompress the desired streams, perform the switching operation in baseband, and then re-compress the resulting switched signal. This approach, however, could introduce significant degradations, especially for broadcast quality streams. Also, performing switching in digital baseband may require costly solutions, especially when multiple programs have to be switched simultaneously.

Another approach to compressed video signal switching is to create seamlessly spliceable streams, which makes it feasible to switch from one compressed video stream to another without the need to go to baseband.

The creation of seamlessly spliceable streams requires the specification and standardization of seamless splicing parameters (such as the ones outlined in the MPEG-2 system document). These splicing parameters are used to construct Seamless Splice Points (SSPs). When switching is desired, a switching device can switch from one SSP of one stream to another SSP of another stream. Because switching takes place from a seamless splice point to another seamless splice point, the output (switched) stream can be decoded by any MPEG-2 compliant receiver without causing any decoder buffer underflow or overflow events. It is important to note that switching from an arbitrary point (i.e. not an SSP) in an MEPG-2 compliant stream to another arbitrary point of an MEPG-2 compliant stream can (and most likely will) cause an underflow or an overflow event at the decoder buffer. Thus, such "arbitrary point switching" is not "seamless".

MEPG-2 defines two seamless splicing parameters: Splice Decoding Delay (SDD) and Maximum Splice Rate (MSR). In accordance with MEPG-2, when constructing an SSP, the following constraints must be adhered to:

1) The amount of time ($dd_f$) that the first byte of the MPEG-2 compliant stream after the SSP has to stay in the decoder buffer before it is decoded is defined as follows:

$$dd_f = SDD$$

2) To prevent a decoder buffer overflow event, it is necessary to adhere to the following constraints when constructing an SSP.

a) The bitrate that must be assumed ($r_a$) when creating the pictures prior to an SSP has to be MSR:

$$r_a = MSR$$

b) The bitrate that must be used ($r_u$) after an SSP has to be less than or equal to MSR:

$$r_u \leq MSR.$$

The SMPTE committee on MPEG-2 splicing built on the MPEG-2 seamless splicing work and started a new effort to standardize splicing constraints and tools, in general, and specific SDD and MSR values, in particular. The SMPTE committee defines two types of splice points: In Point (IP) and Out Point (OP). According to the SMPTE draft standard, an In Point is "a point in a PID stream where a splicing device may enter". (A PID stream can be a video stream, audio stream, etc.). Similarly, an Out Point is defined as "a point in a PID stream where a splicing device may exit".

Also, according to SMPTE teachings, every seamless video In Point must meet all the constraints of a seamless video Out Point (the terms seamless video In Point and seamless video Out Point will hereinafter be referred to simply as "seamless In Point" and "seamless Out Point"). However, a seamless In Point must have additional constraints. The main (video related) constraint is that the first picture after a seamless In Point must be an Intra-coded (I) picture. Therefore, based on the SMPTE committee teachings, all of the SDD and MSR related constraints (outlined above) must be adhered to when constructing both seamless In Points and seamless Out Points.

As a consequence, the presently known technology imposes the following constraints on the construction of both seamless video In Points and Out Points:

$$dd_f = SDD$$

$$r_a = MSR$$

$$r_u \leq MSR$$

These constraints, however, make it very difficult to maintain good picture quality when constructing seamless splice points. This is especially true when the normal bit rate ($r_n$) of the stream where seamless splice points must be inserted is very different from MSR. A graphical depiction of these constraints is presented in FIG. 1, which also illustrates an example of the encoder buffer bounds that must be adhered to when constructing a seamless In Point or seamless Out Point, as well as the "normal" lower and upper encoder bounds i.e., the encoder bounds that must normally be adhered to by the encoder when there is no need to construct an SSP, in accordance with the teachings of co-pending U.S. patent application Ser. No. 08/829,124, assigned to the present assignee (one of the co-inventors, Mahesh Balakrishnan, being one of the present co-inventors now U.S. Pat. No. 5,982,436 the disclosure of which is herein incorporated by reference. As illustrated in this example, the encoder must adhere to stringent buffer constraints when constructing an SSP.

A novel method for constructing seamless In and Out Points in such a manner as to eliminate some of these stringent constraints is disclosed in co-pending U.S. patent application Ser. No. 08/977,989 titled Video Buffer for Seamless Splicing of MPEG Streams, filed on Nov. 25, 1997, by Hayder Radha, one of the present co-inventors, and assigned to the present assignee, the disclosure of which is also herein incorporated by reference. An example of how this method is used to construct seamless In and Out Points is graphically depicted in FIG. 2. As can be seen, in some seamless In and Out Point cases, the stringent constraints are not eliminated by using this approach.

Based on the above and foregoing, it can be appreciated by those skilled in the pertinent art that there presently exists a need in the art for a novel method for constructing seamless Out Points and seamless In Points which enables the encoder to construct seamless Out Points and seamless In Points while using and assuming bit rates equal to the normal bit rates, thereby eliminating major seamless splicing constraints which can not be eliminated using the present technology, and consequently significantly improving the picture quality around the seamless In Points and seamless Out Points relative to the present technology. The present invention fulfills this need in the art.

SUMMARY OF THE INVENTION

Accordingly, one objective of the present invention is to enable encoders to construct seamless In and Out Points while assuming and using their normal bitrates. This objective can be expressed as follows:

$$r_a = r_n$$

and, $$r_u = r_n,$$

where $r_a$ is the assumed bit rate, $r_n$ is the normal bit rate, and $r_u$ is the bit rate actually used.

To achieve this and other objectives, the present invention encompasses, in one of its aspects, a method of encoding a digital video bit stream which includes a plurality of successively-encoded pictures which includes the steps of constructing a seamless In Point in accordance with a constraint expressed by the following equation(1):

$$dd_{f\_ip} \leq \text{minimum } \{DD_{thr\_ip}, (B_d/r_{n\_ip})\}, \quad (1)$$

where $dd_{f\_ip}$ represents an amount of time by which a first byte of the digital video bit stream after the seamless In Point must stay in a decoder buffer before it is decoded; $B_d$ is a size of the decoder buffer; $r_{n\_ip}$ is a bit rate at which the digital video bit stream is normally encoded at the seamless In Point; and, $DD_{thr\_ip}$ represents a prescribed minimum decoding delay threshold for seamless In Points, where $DD_{thr\_ip}$ is defined by the following equation (2):

$$DD_{thr\_ip} = ((MSR/r_{n\_ip})*SDD) + T_{p\_i}*(1-(MSR/r_{n\_ip}), \quad (2)$$

where $T_{p\_i}$ is a time needed for displaying a picture which starts being displayed at a time of decoding of a last picture prior to the seamless In Point; SDD is a prescribed splice decoding delay; and, MSR is a prescribed maximum splice rate, and then inserting the seamless In Point at a first point in the digital video bit stream at which another digital video bit stream can be spliced into the digital video bit stream.

The present invention encompasses, in another of its aspects, a method of encoding a digital video bit stream which includes a plurality of successively-encoded pictures which includes the steps of constructing a seamless Out Point in accordance with a constraint expressed by the following equation (3):

$$DD_{thr\_op} \leq dd_{f\_op} \leq (B_d/r_{n\_op}), \quad (3)$$

where $dd_{f\_op}$ represents an amount of time by which a first byte of the digital video bit stream after the seamless Out Point must stay in a decoder buffer before it is decoded: $r_{n\_op}$ is a bit rate at which the digital video bit stream is normally encoded at the seamless Out Point; and, $DD_{thr\_op}$ represents a prescribed minimum decoding delay threshold for seamless Out Points, where $DD_{thr\_op}$ is defined by the following equation (4):

$$DD_{thr\_op} = ((MSR/r_{n\_op})*SDD) - T_{p\_o}*((MSR/r_{n\_op})-1), \quad (4)$$

where $T_{p\_o}$ is a time needed for displaying a picture which starts being displayed at a time of decoding of a last picture prior to the seamless Out Point; and then inserting the seamless Out Point at a first point in the digital video bit stream at which it can be spliced into another digital video bit stream.

The present invention encompasses, in another of its aspects, a method for splicing a first digital video bit stream at an Out Point into a second digital video bit stream at an In Point, which includes the steps of measuring $dd_{f\_op}$, measuring $dd_{f\_ip}$, computing a difference W equal to $dd_{f\_op} - dd_{f\_ip}$, switching from the Out Point, and, after switching from the Out Point, waiting an amount of time equal to W, and then switching into the In Point.

In yet another of its aspects, the present invention encompasses a method for splicing a first digital video bit stream having at an Out Point into a second digital video bit stream at an In Point, which includes the steps of measuring $dd_{f\_op}$, measuring $dd_{f\_ip}$, computing a difference W equal to $dd_{f\_op} - dd_{f\_ip}$, switching from the Out Point, streaming the second digital video bit stream at a first rate $R_W \leq r_{n\_op}$ for a first time period having a duration equal to W, and, then streaming the second digital video bit stream for a second time period having a duration $dd'_{f\_ip}$ at a second rate $R_{sp\_in}$ defined by the following equation:

$$R_{sp\_in} = ((r_{n\_ip}*dd'_{f\_ip}) - (R_W*W))/dd'_{f\_ip},$$

In yet another of its aspects, the present invention encompasses a method for splicing a first digital video bit stream having at an Out Point into a second digital video bit stream at an In Point, which includes the steps of measuring $dd_{f\_op}$, measuring $dd_{f\_ip}$, computing a difference W equal to $dd_{f\_op} - dd_{f\_ip}$, computing a stream bit rate $R_{sp\_op}$ according to the following equation (1):

$$R_{sp\_op} = (dd_{f\_ip}/dd_{f\_op})*r_{n\_ip}; \quad (1)$$

determining if $R_{sp\_op} \leq r_{n\_op}$; if it is determined that $R_{sp\_op} \leq r_{n\_op}$, then switching from the Out Point and streaming the second digital video bit stream at the rate $R_{sp\_op}$ for the duration of $dd_{f\_op}$; and, if it is determined that $R_{sp\_op} > r_{n\_op}$, then switching from the Out Point and performing a selected one of the following two possible procedures:

(i) waiting an amount of time equal to W, and then switching into the In Point; or, (ii) (A) streaming the second digital video bit stream at a first rate $R_W \leq r_{n\_op}$ for a first time period having a duration equal to W; and, (B) then streaming the second digital video bit stream for a second time period having a duration $dd'_{f\_ip}$ at a second rate $R_{sp\_in}$ defined by the following equation (2):

$$R_{sp\_in} = ((r_{n\_ip}*dd'_{f\_ip}) - (R_W*W))/dd'_{f\_ip}, \quad (2)$$

where $dd'_{f\_ip} = dd_{f\_ip} - T_{p\_0}$.

In still other of its aspects, the present invention encompasses a video signal which includes a digital video bit stream encoded in accordance with any one or more of the encoding methods of the present invention; a video signal which includes first and second digital video bit streams spliced together in accordance with any of the splicing methods of the present invention; and, an encoder for implementing any one or encoding methods of the present invention.

BRIEF DESCRIPTION OF THE DRAWINGS

The above and other objects, features, and advantages of the present invention will become apparent from the following detailed description taken in conjunction with the accompanying drawings, in which.

DETAILED DESCRIPTION OF THE INVENTION

Figure 1:
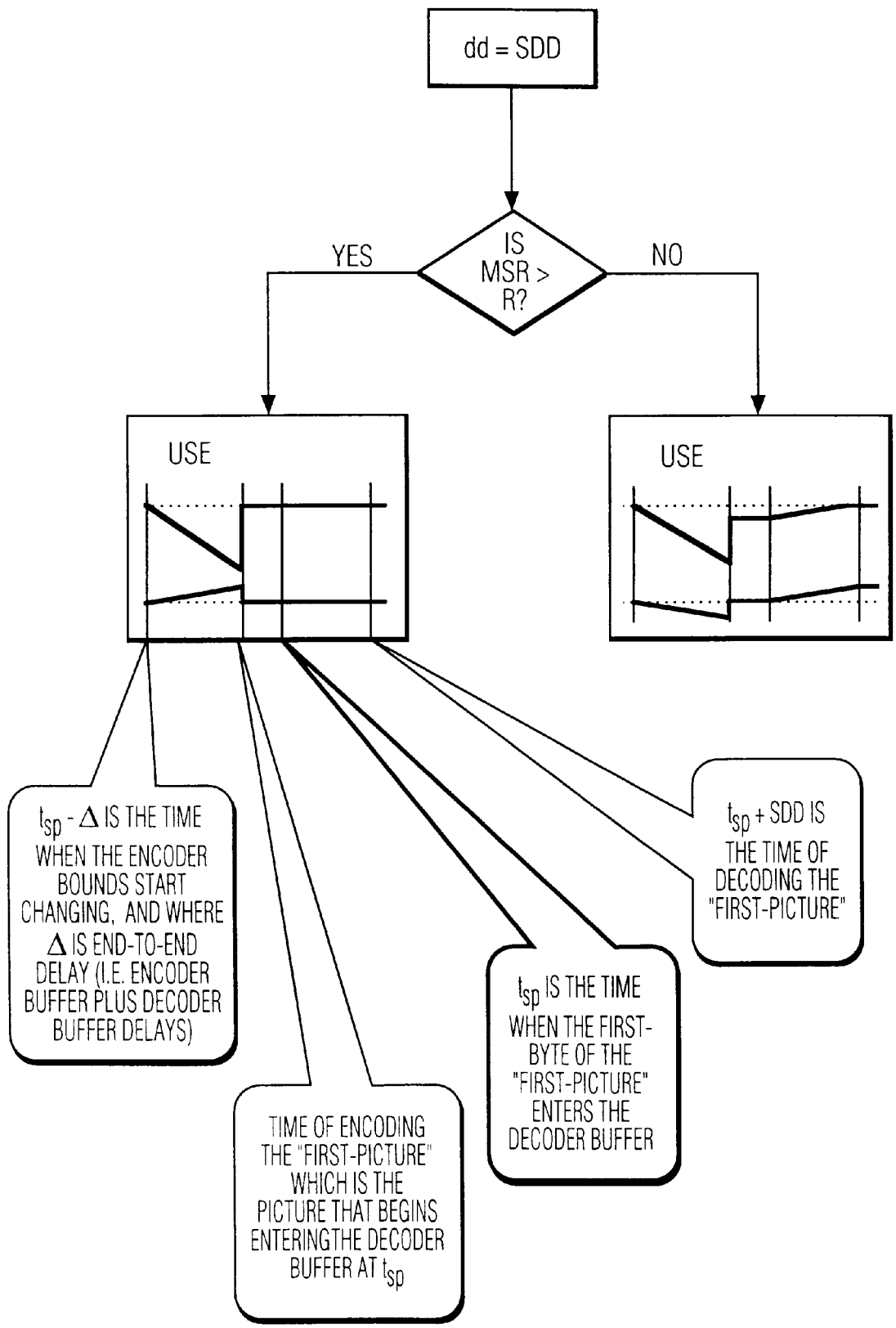
FIG. 1 is combination flow chart and graphical depiction of a method used by an encoder in constructing a seamless splice (In or Out) point, in accordance with the teachings of co-pending U.S. application Ser. No. 08/829,124, now U.S. Pat. No. 5,982,436.
Figure 2:
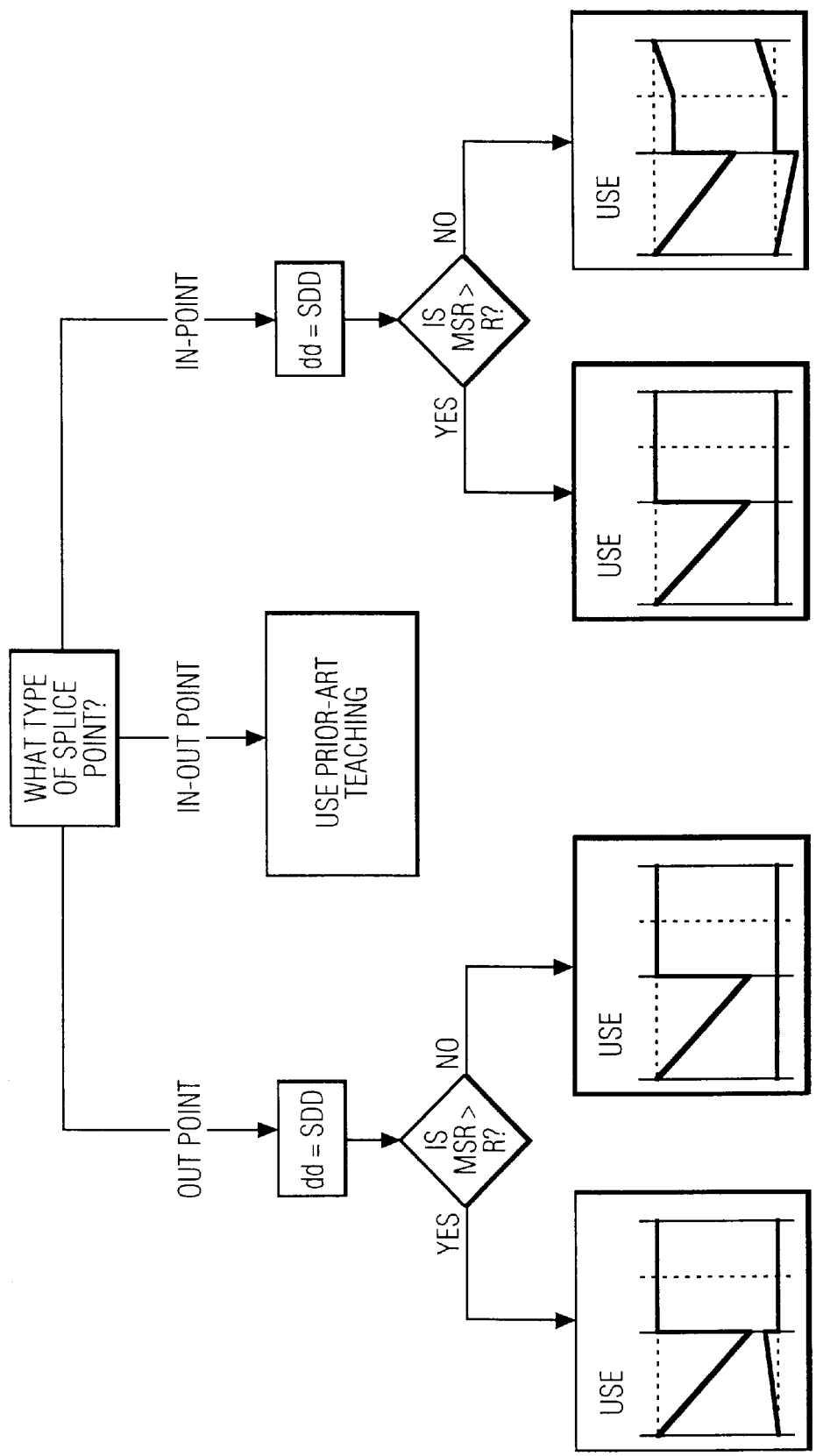
FIG. 2 is a combination flow chart and graphical depiction of a method used by an encoder in constructing a seamless splice points, in accordance with the teachings of co-pending U.S. application Ser. No. 08/977,989 titled Video Buffer for Seamless Splicing of MPEG Streams filed Nov. 25, 1997, and, FIG. 3 is a combination flow chart and graphical depiction of a method used by an encoder in constructing a seamless splice points, in accordance with the preferred embodiment of the present invention.

In accordance with the conventional approach, when constructing a seamless Out Point, when the normal encoder bit rate $r_{n\_op}$ is smaller than MSR, the encoder must assume the higher MSR rate, i.e., $r_a = MSR > r_{n\_op}$.

In accordance with one aspect of the present invention, an encoder can assume its normal bit rate $r_{n\_op}$ when constructing a seamless Out Point, by selecting a value for the decoding delay $dd_{f\_op}$ (which is larger than SDD) such that $dd_{f\_op}$ meets the constraint expressed by the following equation (1):

$$DD_{thr\_op} \leq dd_{f\_op} \leq (B_d/r_{n\_op}), \qquad (1)$$

where $B_d$ is the decoder buffer size, and $DD_{thr\_op}$ is a decoding delay threshold for a seamless Out Point which has a value defined by the following equation(2):

$$DD_{thr\_op} = ((MSR/r_{n\_op})*SDD) - T_{p\_o}*(MSR/r_{n\_op}) - 1), \qquad (2)$$

where $T_{p\_o}$ is the time needed for displaying the picture which starts displaying at the time of decoding of the last picture prior to the seamless Out Point.

Thus, in accordance with the present invention, an encoder can construct a seamless Out Point when the normal encoder bit rate $r_{n\_op}$ is smaller than MSR, by selecting a value for the decoding delay $dd_{f\_op}$ which meets the constraints specified in equations (1) and (2) above. This enables the encoder to assume its normal bit rate $r_{n\_op}$ and not the higher bit rate MSR, thereby significantly improving the quality of pictures constructed around a seamless Out Point.

A particular value for $dd_{f\_op}$ which always meet the constraints expressed in equations (1) and (2) is defined by the following equation (3):

$$dd_{f\_op} = (MSR/r_{n\_op})*SDD. \qquad (3)$$

Therefore, in accordance with the present invention, an encoder can construct a seamless Out Point when the normal rate $r_{n\_op}$ is smaller than MSR, by selecting the particular value for the decoding delay $dd_{f\_op}$ defined by equation (3). This enables the encoder to assume its normal bit rate $r_{n\_op}$ and not the higher bit rate MSR, thereby significantly improving the quality of pictures constructed around a seamless Out Point.

Since equation (3) always satisfies the constraints expressed by equations (1) and (2), and further, since MSR and SDD are always selected such that (MSR*SDD $\leq B_d$), then defining a particular value for $dd_{f\_op}$ by using equation (3) provides the following enumerated benefits:

1. It ensures the construction of a seamless Out Point without the need to evaluate the relationship among the quantities $B_d$, $r_{n\_op}$, MSR, and SDD.
2. It eliminates the need for knowing the value of $T_{p\_o}$ when evaluating the decoding delay threshold $DD_{thr\_op}$ as expressed in equation (2). This could be useful for video sequences that have variable picture-display times.
3. It requires less buffering at the splicer, as will be developed hereinafter.
4. It is easier to specify in an industry-wide standard (e.g. SMPTE or MPEG).

In accordance with the conventional approach, when constructing a seamless In Point when the normal encoder bit rate $r_{n\_ip}$ is larger than MSR, the encoder must use the lower MSR rate, i.e., $r_u = MSR < r_{n\_ip}$ for an amount of time equal to SDD after the seamless In Point.

In accordance with the present invention, an encoder can use its normal bit rate $r_{n\_ip}$ when constructing a seamless In Point, by selecting a value for the decoding delay $dd_{f\_ip}$ which is smaller than SDD, such that $dd_{f\_ip}$ meets the constraint expressed by the following equation (4):

$$dd_{f\_ip} \leq \text{minimum } \{DD_{thr\_ip}, (B_d/r_{n\_ip})\}, \qquad (4)$$

where $B_d$ is the decoder buffer size, and $DD_{thr\_ip}$ is a decoding delay threshold for an In Point which has a value defined by the following equation (5):

$$DD_{thr\_ip} = ((MSR/r_{n\_ip})*SDD) + T_{p\_i}*(1-(MSR/r_{n\_ip})), \qquad (5)$$

where $T_{p\_i}$ is the time needed for displaying the picture which starts displaying at the time of decoding of the last picture prior to the seamless In Point.

Thus, in accordance with the present invention, an encoder can construct a seamless In Point when the normal encoder bit rate $r_{n\_ip}$ is larger than MSR, by selecting a value for the decoding delay $dd_{f\_ip}$ which satisfies the constraints expressed in equations (4) and (5). This enables the encoder to use its normal bit rate $r_{n\_ip}$ and not the lower bit rate MSR, thereby significantly improving the quality of pictures constructed around a seamless In Point.

A particular value for $dd_{f\_ip}$ which always meet the constraints expressed in equations (4) and (5) is defined by the following equation (6):

$$dd_{f\_ip} = (MSR/r_{n\_ip})*SDD. \qquad (6)$$

Thus, in accordance with the present invention, an encoder can construct a seamless In Point when the normal encoder bit rate $r_{n\_ip}$ is larger than MSR, by selecting the particular value for the decoding delay $dd_{f\_ip}$ defined by equation (6). This enables the encoder to use its normal bit rate $r_{n\_ip}$ and not the smaller bit rate MSR, thereby significantly improving the quality of pictures constructed around a seamless In Point.

Since equation (6) always satisfies the constraints expressed by equations (4) and (5), and further, since MSR and SDD are always selected such that (MSR*SDD $\leq B_d$), then equation (6) provides the following enumerated benefits:

1. It ensures the construction of a seamless In Point without the need to evaluate the relationship among the quantities $B_d$, $r_{n\_ip}$, MSR, and SDD.
2. It eliminates the need for knowing the value of $T_{p\_i}$ when evaluating the decoding delay threshold $DD_{thr\_ip}$ as expressed in equation (5). This could be useful for video sequences that have variable picture-display times.

3. It requires less buffering at the splicer, as will be developed hereinafter.

4. It is easier to specify in an industry-wide standard (e.g. SMPTE or MPEG).

A splicer operating on digital video bit streams that include Seamless Splice Points ($SSP_i$) constructed in accordance with the present invention can use the following procedures to achieve seamless splicing (i.e., without causing the decoder buffer underflow or overflow):

1) The decoding delay ($dd_{f\_op}$) of the seamless Out Point is measured.

2) The decoding delay ($dd_{f\_ip}$) of the seamless In Point is measured.

3) The difference (W) between the two decoding delays is computed in accordance with the following equation (7):

$$W = dd_{f\_op} - dd_{f\_ip} \quad (7)$$

4) After switching from the seamless Out Point, the splicer can use any one of the following procedures a, b, or c (the desired procedure could be selected by the user or automatically under software control):

a) Wait an amount of time equal to W before switching into the seamless In Point. For example, the splicer can send NULL packets for the duration of W.

b) Use the following steps:
  i) Stream the In Point stream (e.g., first digital video bit stream) at a rate ($R_W$) less than or equal to the Out Point rate (i.e., $r_{n\_op}$) for the duration of W, as expressed by the following equation (8):

$$R_W \leq r_{n\_op} \quad (8)$$

ii) Then, stream the In Point stream for the duration $dd'_{f\_ip}$ at a rate $R_{sp\_in}$ defined by the following equation (9):

$$R_{sp\_in} = ((r_{n\_ip} * dd'_{f\_ip}) - (R_W * W))/dd'_{f\_ip}, \quad (9)$$

where $dd'_{f\_ip} = dd_{f\_ip} - T_{p\_0}$.

c) Use the following steps:
  i) Compute the bitrate $R_{sp\_op}$ in accordance with the following equation (10):

$$R_{sp\_op} = (dd_{f\_ip}/dd_{f\_op}) * r_{n\_ip} \quad (10)$$

ii) If $R_{sp\_op} \leq r_{n\_op}$, stream the In Point stream for the duration $dd_{f\_op}$ at the rate $R_{sp\_op}$.
  Else: use either procedure (a) or (b) above.

It should be appreciated by those skilled in the pertinent art that seamless splicing is possible between a Seamless Splice Point (SSP) constructed in accordance with other known techniques and a Seamless Splice Point ($SSP_i$) constructed in accordance with the present invention. In a similar vein, it should also be appreciated that the above-described methods of splicing in accordance with the present invention for splicing between an $SSP_i$ and another $SSP_i$, can also be used to splice from an SSP to an $SSP_i$, from an $SSP_i$ to an SSP, and from an SSP to another SSP. (In the last case, W will be zero). Further, the splicing technique of the present invention can be used to splice between non-seamless In and Out Points, or between a non-SSP and an SSP (or $SSP_i$), although, in these cases, it should be recognized that the splice will not be seamless unless the following constraints are satisfied: $dd_{f\_op} > dd_{f\_ip}$, and $r_{n\_op} > r_{n\_ip}$.

Further, the size of the buffer ($B_{sp}$) needed in the splicer to implement the present invention can be computed from the maximum value $W_{max}$ that the duration W can have, in accordance with the following equation (11):

$$B_{sp} = W_{max} \cdot R_{max}, \quad (11)$$

where $R_{max}$ is the maximum bit rate the splicer can receive. If equations (3) and (6) are used to construct seamless In and Out Points in accordance with the present invention, then $W_{max}$ can be expressed by the following equation (12):

$$W_{max} = W_{max\_1} = ((MSR/r_{min\_op}) - (MSR/r_{max\_ip})) * SDD = MSR * SDD * ((1/r_{min\_op}) - (1/r_{max\_ip})) \leq B_d * ((1/r_{min\_op}) - (1/r_{max\_ip})). \quad (12)$$

However, if Equations (1)/(2) and Equations (4)/(5) are used to construct seamless In and Out Points in accordance with the present invention, then $W_{max}$ can be expressed by the following equation (13):

$$W_{max} = W_{max\_2} = B_d/r_{min\_op} \quad (13)$$

By Comparing Equations (12) and (13), it is clear that $W_{max\_2}$ is always larger than $W_{max\_1}$. Therefore, as mentioned previously, using Equations (3) and (6) to construct seamless In and Out Points reduces the size of the buffer needed in the splicer when compared with the buffer size needed when the more general thresholds of Equations (1)/(2) and Equations (4)/(5) are used for constructing the seamless In and Out Points.

Figure 3:
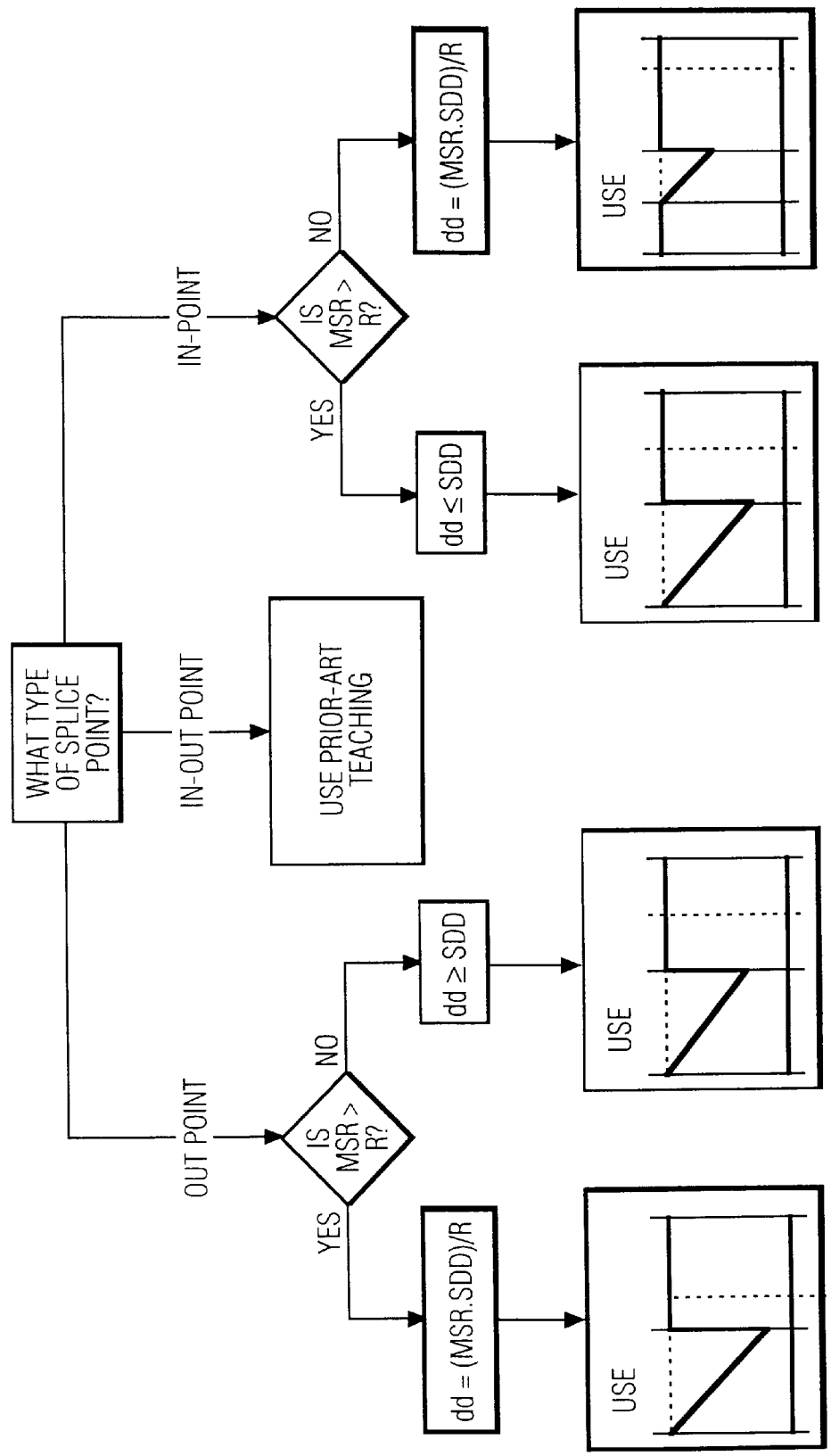

Although the present invention has been described in detail hereinabove, it should be clearly understood that many variations and/or modifications of the basic inventive concepts taught herein which may appear to those skilled in the pertinent art will still fall within the spirit and scope of the present invention as defined in the appended claims. Further it should be appreciated by those skilled in the art that the implementation of the encoding and splicing methods of the present invention described hereinabove in hardware and/or software is routine and straightforward. For example, simple programming of programmanble logic circuitry of an encoder or splicer can be used to implement the methods of the present invention. Additionally, a flow chart of the methodology of constructing seamless In and Out Points in accordance with the present invention is depicted in FIG. 3, as well as graphs which illustrate exemplary uses of the present invention.

What is claimed is:

1. A method of encoding a digital video bit stream which includes a plurality of successively-encoded pictures, including the steps of:

constructing a seamless In Point in accordance with a constraint expressed by the following equation (1):

$$dd_{f\_ip} \leq \text{minimum } \{DD_{thr\_ip}, (B_d/r_{n\_ip})\}, \quad (1)$$

where $dd_{f\_ip}$ represents an amount of time by which a first byte of the digital video bit stream after the seamless In Point must stay in a decoder buffer before it is decoded; $B_d$ is a size of the decoder buffer; $r_{n\_ip}$ is a bit rate at which the digital video bit stream is normally encoded at the seamless In Point; and, $DD_{thr\_ip}$ represents a prescribed minimum decoding delay threshold for seamless In Points, where $DD_{thr\_ip}$ is defined by the following equation (2):

$$DD_{thr\_ip} = ((MSR/r_{n\_ip}) * SDD) + T_{p\_i} * (1 - (MSR/r_{n\_ip}), \quad (2)$$

where $T_{p\_i}$ is a time needed for displaying a picture which starts being displayed at a time of decoding of a last picture prior to the seamless In Point; SDD is a prescribed splice decoding delay; and, MSR is a prescribed maximum splice rate; and, inserting the seamless In Point at a first point in the digital video bit stream at which another digital video bit stream can be spliced into the digital video bit stream.

2. The method as set forth in claim 1, further including the steps of:

determining if $MSR > r_{n\_ip}$, selecting $dd_{f\_ip}$ to have a value $\leq SDD$ if it is determined that MSR is greater than $r_{n\_ip}$; and, selecting $dd_{f\_ip}$ to have a value $dd_{r\_ip}$ defined by the following equation (3) if it is determined that MSR is not greater than $r_{n\_ip}$:

$$dd_{r\_ip} = (MSR/r_{n\_ip}) * SDD \quad (3).$$

3. The method as set forth in claim 1, wherein $r_{n\_ip} > MSR$.

4. The method as set forth in claim 1, wherein $dd_{f\_ip}$ is selected to have a value $dd_{r\_ip}$ defined by the following equation (3):

$$dd_{r\_ip} = (MSR/r_{n\_ip}) * SDD \quad (3).$$

5. The method as set forth in claim 1, wherein MSR and SDD are selected to have values that satisfy a constraint expressed by the following equation (4):

$$MSR * SDD < B_d \quad (4).$$

6. The method as set forth in claim 2, wherein MSR and SDD are selected to have values that satisfy a constraint expressed by the following equation (4):

$$MSR * SDD < B_d \quad (4).$$

7. The method as set forth in claim 1, wherein the digital video bit stream comprises an MPEG-2 compliant bit stream.

8. The method as set forth in claim 1, wherein SDD and MSR are selected to have specific values in accordance with an MPEG standard.

9. The method as set forth in claim 1, wherein SDD and MSR are selected to have specific values in accordance with SMPTE standard.

10. The method as set forth in claim 1, further including the steps of:

constructing a seamless Out Point in accordance with a constraint expressed by the following equation (5):

$$DD_{thr\_op} \leq dd_{f\_op} \leq (B_d/r_{n\_op}), \quad (5)$$

where $dd_{f\_op}$ represents an amount of time by which a first byte of the digital video bit stream after the seamless Out Point must stay in a decoder buffer before it is decoded; $r_{n\_op}$ is a bit rate at which the first digital video bit stream is normally encoded at the seamless Out Point; and, $DD_{thr\_op}$ represents a prescribed minimum decoding delay threshold for seamless Out Points, where $DD_{thr\_op}$ is defined by the following equation (6):

$$DD_{thr\_op} = ((MSR/r_{n\_op}) * SDD) - T_{p\_o} * ((MSR/r_{n\_op}) - 1), \quad (6)$$

where $T_{p\_o}$ is a time needed for displaying a picture which starts being displayed at a time of decoding of a last picture prior to the seamless Out Point; and, inserting the seamless Out Point at a second point in the digital video bit stream at which it can be spliced into another digital video bit stream.

11. The method as set forth in claim 10, further including the steps of:

determining if $MSR > r_{n\_op}$;

selecting $dd_{f\_op}$ to have a value $\leq SDD$ if it is determined that MSR is not greater than $r_{n\_op}$, within a constraint that $dd_{f\_op} * r_{n\_op} < B_d$; and, selecting $dd_{f\_op}$ to have a value $dd_{r\_op}$ defined by the following equation (7) if it is determined that MSR is greater than $r_{n\_op}$:

$$dd_{r\_op} = (MSR/r_{n\_op}) * SDD \quad (7).$$

12. The method as set forth in claim 10, wherein $r_{n\_op} < MSR$.

13. The method as set forth in claim 10, wherein $dd_{f\_op}$ is selected to have a value $dd_{r\_op}$ defined by the following equation (7):

$$dd_{r\_op} = (MSR/r_{n\_op}) * SDD \quad (7).$$

14. The method as set forth in claim 10, wherein MSR and SDD are selected to have values that satisfy a constraint expressed by the following equation (4):

$$MSR * SDD < B_d \quad (4).$$

15. The method as set forth in claim 11, wherein MSR and SDD are selected to have values that satisfy a constraint expressed by the following equation (4):

$$MSR * SDD < B_d \quad (4).$$

16. A method of encoding a digital video bit stream which includes a plurality of successively-encoded pictures, including the steps of:

constructing a seamless Out Point in accordance with a constraint expressed by the following equation (1):

$$DD_{thr\_op} \leq dd_{f\_op} \leq (B_d/r_{n\_op}), \quad (1)$$

where $dd_{\_op}$ represents an amount of time by which a first byte of the digital video bit stream after the seamless Out Point must stay in a decoder buffer before it is decoded; $B_d$ is a size of the decoder buffer; $r_{n\_op}$ is a bit rate at which the digital video bit stream is normally encoded at the seamless Out Point; and, $DD_{thr\_op}$ represents a prescribed minimum decoding delay threshold for seamless Out Points, where $DD_{thr\_op}$ is defined by the following equation (2):

$$DD_{thr\_op} = ((MSR/r_{n\_op}) * SDD) - T_{p\_o} * ((MSR/r_{n\_op}) - 1), \quad (2)$$

where $T_{p\_o}$ is a time needed for displaying a picture which starts being displayed at a time of decoding of a last picture prior to the seamless Out Point; SDD is a prescribed splice decoding delay; and, MSR is a prescribed maximum splice rate; and, inserting the seamless Out Point at a first point in the digital video bit stream at which it can be spliced into another digital video bit stream.

17. The method as set forth in claim 16, further including the steps of:

determining if $MSR > r_{n\_op}$;

selecting $dd_{f\_op}$ to have a value $\geq SDD$ if it is determined that MSR is not greater than $r_{n\_op}$, within a constraint that $dd_{f\_op} * r_{n\_op} < B_d$; and, selecting $dd_{f\_op}$ to have a value $dd_{r\_op}$ defined by the following equation (3) if it is determined that MSR is greater than $r_{n\_op}$:

$$dd_{r\_op} = (MSR/r_{n\_op}) * SDD \quad (3).$$

18. The method as set forth in claim 16, wherein $r_{n\_op} < MSR$.

19. The method as set forth in claim 16, wherein $dd_{f\_op}$ is selected to have a value $dd_{r\_op}$ defined by the following equation (3):

$$dd_{r\_op} = (MSR/r_{n\_op}) * SDD \quad (3).$$

20. The method as set forth in claim 16, wherein MSR and SDD are selected to have values that satisfy a constraint expressed by the following equation (4):

$$MSR * SDD < B_d \quad (4).$$

21. The method as set forth in claim 17, wherein MSR and SDD are selected to have values that satisfy a constraint expressed by the following equation (4):

$$MSR * SDD < B_d \quad (4).$$

22. A method for splicing a first digital video bit stream at an Out Point into a second digital video bit stream at an In Point, the method including the steps of:

measuring $dd_{f\_op}$;

measuring $dd_{f\_ip}$;

computing a difference W equal to $dd_{f\_op} - dd_{f\_ip}$;

switching from the Out Point; and, after switching from the Out Point, waiting an amount of time equal to W, and then switching into the In Point;

wherein $dd_{f\_ip}$ represents an amount of time by which a first byte of the second digital video bit stream after the In Point must stay in a decoder buffer before it is decoded, and $dd_{f\_op}$ represents an amount of time by which a first byte of the first digital video bit stream after the Out Point must stay in the decoder buffer before it is decoded.

23. The method as set forth in claim 22, wherein the step of waiting is carried out by sending null packets for the duration of the waiting time W.

24. The method as set forth in claim 22, wherein the Out Point is constructed by:

constructing the Out Point in accordance with a constraint expressed by the following equation (1):

$$DD_{thr\_op} < dd_{f\_op} < (B_d/r_{n\_op}), \quad (1)$$

where $B_d$ is a size of the decoder buffer; $r_{n\_op}$ is a bit rate at which the first digital video bit stream is normally encoded at the Out Point; and, $DD_{thr\_op}$ represents a prescribed minimum decoding delay threshold for Out Points defined by the following equation (2);

$$DD_{thr\_op} = ((MSR/r_{n\_op}) * SDD) - T_{p\_o} * (MSR/r_{n\_op}) - 1), \quad (2)$$

where $T_{p\_o}$ is a time needed for displaying a picture which starts being displayed at a time of decoding of a last picture prior to the Out Point; SDD is a prescribed splice decoding delay; and, MSR is a prescribed maximum splice rate; and, inserting the Out Point at a first point in the first digital video bit stream at which it can be spliced into another digital video bit stream.

25. The method as set forth in claim 22, wherein the In Point is constructed by:

constructing the In Point in accordance with a constraint expressed by the following equation (1):

$$dd_{f\_ip} < \text{miminum } \{DD_{thr\_ip}, (B_d/r_{n\_ip})\}, \quad (1)$$

where $B_d$ is a size of the decoder buffer; $r_{n\_ip}$ is a bit rate at which the second digital video bit stream is normally encoded at the In Point; and, $DD_{thr\_ip}$ represents a prescribed minimum decoding delay threshold for In Points defined by the following equation (2):

$$DD_{thr\_ip} = ((MSR/r_{n\_ip}) * SDD) - T_{p\_i} * (1 - MSR/r_{n\_ip}), \quad (2)$$

where $T_{p\_i}$ is a time needed for displaying a picture which starts being displayed at a time of decoding of a last picture prior to the In Point; SDD is a prescribed splice decoding delay; and, MSR is a prescribed maximum splice rate; and, inserting the In Point at a first point in the second digital video bit stream at which it can be spliced into another digital video bit stream.

26. The method as set forth in claim 24, wherein the In Point is constructed by:

constructing the In Point in accordance with a constraint expressed by the following equation (1);

$$dd_{f\_ip} < \text{miminum } \{DD_{thr\_ip}, (B_d/r_{n\_ip})\}, \quad (1)$$

where $r_{n\_ip}$ is a bit rate at which the second digital video bit stream is normally encoded at the In Point; and, $DD_{thr\_ip}$ represents a prescribed minimum decoding delay threshold for In Points defined by the following equation (2):

$$DD_{thr\_ip} = ((MSR/r_{n\_ip}) * SDD) - T_{p\_i} * (1 - MSR/r_{n\_ip}), \quad (2)$$

where $T_{p\_i}$ is a time needed for displaying a picture which starts being displayed at a time of decoding of a last picture prior to the In Point; and, inserting the In Point at a first point in the second digital video bit stream at which it can be spliced into another digital video bit stream.

27. The method as set forth in claim 22, wherein the In Point is a seamless In Point and the Out Point is a non-seamless Out Point, whereby the switching is seamless if the following two constraints are satisfied:

a) $dd_{f\_op} > dd_{f\_ip}$; and, b) $r_{n\_op} > rn\_ip$;

where $r_{n\_ip}$ is a bit rate at which the second digital video bit stream is normally encoded at the In Point; and, $r_{n\_op}$ is a bit rate at which the first digital video bit stream is normally encoded at the Out Point.

28. The method as set forth in claim 22, wherein the In Point is a non-seamless In Point and the Out Point is a non-seamless Out Point, whereby the switching is seamless if the following two constraints are satisfied:

a) $dd_{f\_op} > dd_{f\_ip}$; and, b) $r_{n\_op} > r_{n\_ip}$;

where $r_{n\_ip}$ is a bit rate at which the second digital video bit stream is normally encoded at the In Point; and, $r_{n\_op}$ is a bit rate at which the first digital video bit stream is normally encoded at the Out Point.

29. The method as set forth in claim 22, wherein the In Point is a non-seamless In Point and the Out Point is a seamless Out Point, whereby the switching is seamless if the following two constraints are satisfied:

a) $dd_{f\_op} > dd_{f\_ip}$; and, b) $r_{n\_op} > r_{n\_ip}$;

where $r_{n\_ip}$ is a bit rate at which the second digital video bit stream is normally encoded at the In Point; and, $r_{n\_op}$ is a bit rate at which the first digital video bit stream is normally encoded at the Out Point.

30. A method for splicing a first digital video bit stream at an Out Point into a second digital video bit stream at an In Point, the method including the steps of:

measuring $dd_{f\_op}$;

measuring $dd_{f\_ip}$;

computing a difference W equal to $dd_{f\_op} - dd_{f\_ip}$;

switching from the Out Point;

streaming the second digital video bit stream at a first rate $R_w \leq r_{n\_op}$ for a first time period having a duration equal to W; and, then streaming the second digital video bit stream for a second time period having a duration $dd'_{f\_ip}$ at a second rate $R_{sp\_in}$ defined by the following equation:

$$R_{sp\_in}=((r_{n\_ip}* dd'_{f\_ip})-(R_w*W))/dd'_{f\_ip},$$

where $dd'_{f\_ip}=dd_{f\_ip}-T_{p\_o}$; $T_{p\_o}$ is a time needed for displaying a picture which starts being displayed at a time of decoding of a last picture prior to the Out Point; $dd_{f\_ip}$ represents an amount of time by which a first byte of the second digital video bit stream after the In Point must stay in a decoder buffer before it is decoded; $dd_{f\_op}$ represents an amount of time by which a first byte of the first digital video bit stream after the Out Point must stay in the decoder buffer before it is decoded; $r_{n\_ip}$ is a bit rate at which the second digital video bit stream is normally encoded at the In Point; and, $r_{n\_op}$ is a bit rate at which the first digital video bit stream is normally encoded at the Out Point.

31. The method as set forth in claim 30, wherein the Out Point is constructed by:
constructing the Out Point in accordance with a constraint expressed by the following equation (1):

$$DD_{thr\_op}<dd_{f\_op}<(B_d/r_{n\_op}),\qquad(1)$$

where $B_d$ is a size of the decoder buffer; and, $DD_{thr\_op}$ represents a prescribed minimum decoding delay threshold for Out Points defined by the following equation (2):

$$DD_{thr\_op}=((MSR/r_{n\_op})* SDD)-T_{p\_o}* (MSR/r_{n\_op})-1),\qquad(2)$$

where SDD is prescribed splice decoding delay; and, MSR is a prescribed maximum splice rate; and,
inserting the Out Point at a first point in the first digital video bit stream at which it can be spliced into another digital video bit stream.

32. The method as set forth in claim 30, wherein the In Point is constructed by:
constructing the In Point in accordance with a constraint expressed by the following equation (1):

$$dd_{f\_ip}<\text{miminum }\{DD_{thr\_ip}, (B_d/r_{n\_ip})\},\qquad(1)$$

where $B_d$ is a size of the decoder buffer; and, $DD_{thr\_ip}$ represents a prescribed minimum decoding delay threshold for In Points defined by the following equation (2):

$$DD_{thr\_ip}=((MSR/r_{n\_ip})* SDD)-T_{p\_i}* (1-MSR/r_{n\_ip}),\qquad(2)$$

where $T_{p\_i}$ is a time needed for displaying a picture which starts being displayed at a time of decoding of a last picture prior to the In Point; SDD is a prescribed splice decoding delay; and, MSR is a prescribed maximum splice rate; and,
inserting the In Point at a first point in the second digital video bit stream at which it can be spliced into another digital video bit stream.

33. The method as set forth in claim 31, wherein the In Point is constructed by:
constructing the In Point in accordance with a constraint expressed by the following equation (1):

$$dd_{f\_ip}<\text{miminum }\{DD_{thr\_ip}, (B_d/r_{n\_ip})\},\qquad(1)$$

where $DD_{thr\_ip}$ represents a prescribed minimum decoding delay threshold for In Points defined by the following equation (2):

$$DD_{thr\_ip}=((MSR/r_{n\_ip})* SDD)-T_{p\_i}* (1-MSR/r_{n\_ip}),\qquad(2)$$

where $T_{p\_i}$ is a time needed for displaying a picture which starts being displayed at a time of decoding of a last picture prior to the In Point; and,
inserting the In Point at a first point in the second digital video bit stream at which it can be spliced into another digital video bit stream.

34. The method as set forth in claim 30, wherein the In Point is a seamless In Point and the Out Point is a non-seamless Out Point, whereby the switching is seamless if the following two constraints are satisfied:
a) $dd_{f\_op}>dd_{f\_ip}$; and,
b) $r_{n\_op}>r_{n\_ip}$.

35. The method as set forth in claim 30, wherein the In Point is a non-seamless In Point and the Out Point is a non-seamless Out Point, whereby the switching is seamless if the following two constraints are satisfied:
a) $dd_{f\_op}>dd_{f\_ip}$; and
b) $r_{n\_op}>r_{n\_ip}$.

36. The method as set forth in claim 30, wherein the In Point is a non-seamless In Point and the Out Point is a seamless Out Point, whereby the switching is seamless if the following two constraints are satisfied:
a) $dd_{f\_op}>dd_{f\_ip}$; and,
b) $r_{n\_op}>r_{n\_ip}$.

37. A method for splicing a first digital video bit stream at an Out Point into a second digital video bit stream at an In Point, the method including the steps of:
measuring $dd_{f\_op}$;
measuring $dd_{f\_ip}$;
computing a difference W equal to $dd_{f\_op}-dd_{f\_ip}$;
computing a stream bit rate $R_{sp\_op}$ according to the following equation (1):

$$R_{sp\_op}=(dd_{f\_ip}/dd_{f\_op})* r_{n\_ip};\qquad(1)$$

determining if $R_{sp\_op}\leq r_{n\_op}$;
if it is determined that $R_{sp\_op}\leq r_{n\_op}$, then switching from the Out Point and streaming the second digital video bit stream at the rate $R_{sp\_op}$ for the duration of $dd_{f\_op}$;
if it is determined that $R_{sp\_op}>r_{n\_op}$, then switching from the Out Point and performing a selected on of the following two possible procedures:
(i) waiting an amount of time equal to W, and then switching into the In Point; or,
(ii) (A) streaming the second digital video bit stream at a first rate $R_w\leq r_{n\_op}$ for a first time period having a duration equal to W; and
then streaming the second digital video bit stream for a second time period having a duration $dd'_{f\_ip}$ at a second rate $R_{sp\_in}$ defined by the following equation (2):

$$R_{sp\_in}=((r_{n\_ip}* dd'_{f\_ip})-(R_w*W))/dd'_{f\_ip},\qquad(2)$$

where $dd'_{f\_ip}=dd_{f\_ip}-T_{p\_o}$; $T_{p\_o}$ is a time needed for displaying a picture which starts being displayed at a time of decoding of a last picture prior to the Out Point; $dd_{f\_ip}$ represents an amount of time by which a first byte of the second digital video bit stream after the In Point must stay in a decoder buffer before it is decoded; $dd_{f\_op}$ represents an amount of time by which a first byte of the first digital video bit stream after the Out Point must stay in the decoder buffer before it is decoded; $r_{n\_ip}$ is a bit rate at which the second digital video bit stream is normally encoded at the In Point; and, $r_{n\_op}$ is a bit rate at which the first digital video bit stream is normally encoded at the Out Point.

38. The method as set forth in claim 37, wherein the Out Point is constructed by:
constructing the Out Point in accordance with a constraint expressed by the following equation (3):

$$DD_{thr\_op} < dd_{f\_op} < (B_d/r_{n\_op}), \quad (3)$$

where $B_d$ is a size of the decoder buffer; and, $DD_{thr\_op}$ represents a prescribed minimum decoding delay threshold for Out Points defined by the following equation (4):

$$DD_{thr\_op} = ((MSR/r_{n\_op})*SDD)) - T_{p\_o}*(MSR/r_{n\_op}) - 1), \quad (4)$$

where SDD is a prescribed splice decoding delay; and, MSR is a prescribed maximum splice rate; and, inserting the Out Point at a first point in the first digital video bit stream at which it can be spliced into another digital video bit stream.

39. The method as set forth in claim 30, wherein the In Point is constructed by:

constructing the In Point in accordance with a constraint expressed by the following equation (3):

$$dd_{f\_ip} < \text{miminum } \{DD_{thr\_ip}, (B_d/r_{n\_ip})\}, \quad (3)$$

where $B_d$ is a size of the decoder buffer; and, $DD_{thr\_ip}$ represents a prescribed minimum decoding delay threshold for In Points defined by the following equation (4):

$$DD_{thr\_ip} = ((MSR/r_{n\_ip})*SDD) - T_{p\_i}*(1 - MSR/r_{n\_ip}), \quad (4)$$

where $T_{p\_i}$ is a time needed for displaying a picture which starts being displayed at a time of decoding of a last picture prior to the In Point; SDD is a prescribed splice decoding delay; and, MSR is a prescribed maximum splice rate; and, inserting the In Point at a first point in the second digital video bit stream at which it can be spliced into another digital video bit stream.

40. The method as set forth in claim 38, wherein the In Point is constructed by:

constructing the In Point in accordance with a constraint expressed by the following equation (3):

$$dd_{f\_ip} < \text{miminum } \{DD_{thr\_ip}, (B_d/r_{n\_ip})\}, \quad (3)$$

where $DD_{thr\_ip}$ represents a prescribed minimum decoding delay threshold for In Points defined by the following equation (4):

$$DD_{thr\_ip} = ((MSR/r_{n\_ip})*SDD) - T_{p\_i}*(1 - MSR/r_{n\_ip}), \quad (4)$$

where $T_{p\_i}$ is a time needed for displaying a picture which starts being displayed at a time of decoding of a last picture prior to the In Point; and, inserting the In Point at a first point in the second digital video bit stream at which it can be spliced into another digital video bit stream.

41. The method as set forth in claim 37, wherein the In Point is a seamless In Point and the Out Point is a non-seamless Out Point, whereby the switching is seamless if the following two constraints are satisfied:

a) $dd_{f\_op} > dd_{f\_ip}$; and,
b) $r_{n\_op} > r_{n\_ip}$.

42. The method as set forth in claim 37, wherein the In Point is a non-seamless In Point and the Out Point is a non-seamless Out Point, whereby the switching is seamless if the following two constraints are satisfied:

a) $dd_{f\_op} > dd_{f\_ip}$; and,
b) $r_{n\_op} > r_{n\_ip}$.

43. The method as set forth in claim 37, wherein the In Point is a non-seamless In Point and the Out Point is a seamless Out Point, whereby the switching is seamless if the following two constraints are satisfied:

a) $dd_{f\_op} > dd_{f\_ip}$; and,
b) $r_{n\_op} > r_{n\_ip}$.

44. A video signal comprising a first digital video bit stream spliced together at an Out Point with a second digital video bit stream at an In Point, wherein:

the In Point is constructed by:
constructing the In Point in accordance with a constraint expressed by the following equation (1):

$$dd_{f\_ip} < \text{miminum } \{DD_{thr\_ip}, (B_d/r_{n\_ip})\}, \quad (1)$$

where $dd_{f\_ip}$ represents an amount of time by which a first byte of the second digital video bit stream after the In Point must stay in a decoder buffer before it is decoded; $B_d$ is a size of the decoder buffer; $r_{n\_ip}$ is a bit rate at which the second digital video bit stream is normally encoded at the In Point; and, $DD_{thr\_ip}$ represents a prescribed minimum decoding delay threshold for In Points defined by the following equation (2):

$$DD_{thr\_ip} = ((MSR/r_{n\_ip})*SDD) - T_{p\_i}*(1 - MSR/r_{n\_ip}), \quad (2)$$

where $T_{p\_i}$ is a time needed for displaying a picture which starts being displayed at a time of decoding of a last picture prior to the In Point; SDD is a prescribed splice decoding delay; and, MSR is a prescribed maximum splice rate; and, inserting the In Point at a first point in the second digital video bit stream at which it can be spliced into another digital video bit stream; and, the Out Point is constructed by:
constructing the Out Point in accordance with a constraint expressed by the following equation (3):

$$DD_{thr\_op} < dd_{f\_op} < (B_d/r_{n\_op}), \quad (3)$$

where $dd_{f\_op}$ represents an amount of time by which a first byte of the first digital video bit stream after the Out Point must stay in the decoder buffer before it is decoded; $r_{n\_op}$ is a bit rate at which the first digital video bit stream is normally encoded at the Out Point; and, $DD_{thr\_op}$ represents a prescribed minimum decoding delay threshold for Out Points defined by the following equation (4):

$$DD_{thr\_op} = ((MSR/r_{n\_op})*SDD) - T_{p\_o}*(MSR/r_{n\_op}) - 1), \quad (4)$$

where $T_{p\_o}$ is a time needed for displaying a picture which starts being displayed at a time of decoding of a last picture prior to the Out Point; and, inserting the Out Point at a first point in the first digital video bit stream at which it can be spliced into another digital video bit stream.

45. The video signal as set forth in claim 44, wherein the first and second digital video bit streams are spliced together by:

measuring $dd_{f\_op}$;
measuring $dd_{f\_ip}$;
computing a difference W equal to $dd_{f\_op} - dd_{f\_ip}$;
switching from the Out Point; and,
after switching from the Out Point, waiting an amount of time equal to W, and then switching into the In Point.

46. The video signal as set forth in claim 44, wherein the first and second digital video bit streams are spliced together by:

measuring $dd_{f\_op}$;
measuring $dd_{f\_ip}$;

computing a difference W equal to $dd_{f\_op} - dd_{f\_ip}$;

switching from the Out Point;

streaming the second digital video bit stream at a first rate $R_w < r_{n\_op}$ for a first time period having a duration equal to W; and, then streaming the second digital video bit stream for a second time period having a duration $dd'_{f\_ip}$ at a second rate $R_{sp\_in}$ defined by the following equation:

$$R_{sp\_in} = ((r_{n\_ip} * dd'_{f\_ip}) - (R_w * W))/dd'_{f\_ip},$$

where $dd'_{f\_ip} = dd_{f\_ip} - t_{p\_o}$.

47. The video signal as set forth in claim 44, wherein the first and second digital video bit streams are spliced together by:

measuring $dd_{f\_op}$;

measuring $dd_{f\_ip}$;

computing a difference W equal to $dd_{f\_op} - dd_{f\_ip}$;

computing a stream bit rate $R_{sp\_op}$ according to the following equation (1)

$$R_{sp\_op} = (dd_{f\_ip}/dd_{f\_op}) * r_{n\_ip}; \tag{1}$$

determining if $R_{sp\_op} < r_{n\_op}$;

if it is determined that $R_{sp\_op} < r_{n\_op}$, then switching from the Out Point and streaming the second digital video bit stream at the rate $R_{sp\_op}$ for the duration of $dd_{f\_op}$;

if it is determined that $R_{sp\_op} > r_{n\_op}$, then switching from the Out Point and performing a selected one of the following two possible procedures:

(i) waiting an amount of time equal to W, and then switching into the In Point; or, (ii) (A) streaming the second digital video bit stream at a first rate $R_w < r_{n\_op}$ for a first time period having a duration equal to W; and then streaming the second digital video bit stream for a second time period having a duration $dd'_{f\_ip}$ at a second rate $R_{sp\_in}$ defined by the following equation (2):

$$R_{sp\_in} = ((r_{n\_ip} * dd'_{f\_ip}) - (R_w * W))/dd'_{f\_ip}, \tag{2}$$

where $dd'_{f\_ip} = dd_{f\_ip} - t_{p\_o}$.

48. A video signal comprising first and second digital video bit streams spliced together by:

measuring $dd_{f\_op}$;

measuring $dd_{f\_ip}$;

computing a difference W equal to $dd_{f\_op} - dd_{f\_ip}$;

switching from an Out Point of the first digital vide obit stream; and, after switching from the Out Point, waiting an amount of time equal to W, and then switching into an In Point of the second digital video bit stream;

wherein $dd_{f\_ip}$ represents an amount of time by which a first byte of the second digital video bit stream after the In Point must stay in a decoder buffer before it is decoded, and $dd_{f\_op}$ represents an amount of time by which a first byte of the first digital video bit stream after the Out Point must stay in the decoder buffer before it is decoded.

49. A video signal comprising first and second digital video bit streams spliced together by:

measuring $dd_{f\_op}$;

measuring $dd_{f\_ip}$;

computing a difference W equal to $dd_{f\_op} - dd_{f\_ip}$;

switching from an Out Point of the first digital video bit stream;

streaming the second digital video bit stream at a first rate $R_w < r_{n\_op}$ for a first time period having a duration equal to W; and, then streaming the second digital video bit stream for a second time period having a duration $dd'_{f\_ip}$ at a second rate $R_{sp\_in}$ defined by the following equation:

$$R_{sp\_in} = ((r_{n\_ip} * dd'_{f\_ip}) - (R_w * W))/dd'_{f\_ip},$$

where $dd'_{f\_ip} = dd_{f\_ip} - T_{p\_o}$; $T_{p\_o}$ is a time needed for displaying a picture which starts being displayed at a time of decoding of a last picture prior to the Out Point; $dd_{f\_ip}$ represents an amount of time by which a first byte of the second digital video bit stream after an In Point of the second digital video bit stream must stay in a decoder buffer before it is decoded; $dd_{f\_op}$ represents an amount of time by which a first byte of the first digital video bit stream after the Out Point must stay in the decoder buffer before it is decoded; $r_{n\_ip}$ is a bit rate at which the second digital video bit stream is normally encoded at the In Point; and, $r_{n\_op}$ is a bit rate at which the first digital video bit stream is normally encoded at the Out Point.

50. A video signal comprising first and second digital video bit streams spliced together by:

measuring $dd_{f\_op}$;

measuring $dd_{f\_ip}$;

computing a difference W equal to $dd_{f\_op} - dd_{f\_ip}$;

computing a stream bit rate $R_{sp\_op}$ according to the following equation (1):

$$R_{sp\_op} = (dd_{f\_ip}/dd_{f\_op}) * r_{n\_ip}; \tag{1}$$

determining if $R_{sp\_op} < r_{n\_op}$;

if it is determined that $R_{sp\_op} < r_{n\_op}$, then switching from an Out Point of the first digital video bit stream and streaming the second digital video bit stream at the rate $R_{sp\_op}$ for the duration of $dd_{f\_op}$;

if it is determined that $R_{sp\_op} > r_{n\_op}$ then switching from the Out Point and performing a selected one of the following two possible procedures:

(i) waiting an amount of time equal to W, and then switching into an In Point of the second digital video bit stream; or, (ii) (A) streaming the second digital video bit stream at a first rate $R_w < r_{n\_op}$ for a first time period having a duration equal to W; and, then streaming the second digital video bit stream for a second time period having a duration $dd'_{f\_ip}$ at a second rate $R_{sp\_in}$ defined by the following equation (2):

$$R_{sp\_in} = ((r_{n\_ip} * dd'_{f\_ip}) - (R_w * W))/dd'_{f\_ip}, \tag{2}$$

where $dd'_{f\_ip} = dd_{f\_ip} - T_{p\_o}$; $T_{p\_o}$ is a time needed for displaying a picture which starts being displayed at a time of decoding of a last picture prior to the Out Point; $dd_{f\_ip}$ represents an amount of time by which a first byte of the second digital video bit stream after the In Point must stay in a decoder buffer before it is decoded; $dd_{f\_op}$ represents an amount of time by which a first byte of the first digital video bit stream after the Out Point must stay in the decoder buffer before it is decoded; $r_{n\_ip}$ is a bit rate at which the second digital vide obit stream is normally encoded at the In Point; and, $r_{n\_op}$ is a bit rate at which the first digital video bit stream is normally encoded at the Out Point.

51. A video signal comprising a digital video bit stream having a seamless In Point constructed in accordance with a constraint expressed by the following equation (1):

$$dd_{f\_ip} \leq \text{minimum } \{DD_{thr\_ip}, (B_d/r_{n\_ip})\}, \qquad (1)$$

where $dd_{f\_ip}$ represents an amount of time by which a first byte of the digital video bit stream after the seamless In Point must stay in a decoder buffer before it is decoded; $B_d$ is a size of the decoder buffer; $r_{n\_ip}$ is a bit rate at which the digital video bit stream is normally encoded at the seamless In Point; and, $DD_{thr\_ip}$ represents a prescribed minimum decoding delay threshold for seamless In Points, where $DD_{thr\_ip}$ is defined by the following equation (2):

$$DD_{thr\_ip} = ((MSR/r_{n\_ip})^* SSD) + T_{p\_i}^* (1-(MSR/r_{n\_ip}), \qquad (2)$$

where $T_{p\_i}$ is a time needed for displaying a picture which starts being displayed at a time of decoding of a last picture prior to the seamless In Point; SDD is a prescribed splice decoding delay; and, MSR is a prescribed maximum splice rate.

52. A video signal comprising a digital video bit stream having a seamless Out Point constructed in accordance with a constraint expressed by the following equation (1):

$$DD_{thr\_op} \leq dd_{f\_op} \leq (B_d/r_{n\_op}), \qquad (1)$$

where $dd_{f\_op}$ represents an amount of time by which a first byte of the digital video bit stream after the seamless Out Point must stay in a decoder buffer before it is decoded; $B_d$ is a size of the decoder buffer; $r_{n\_op}$ is a bit rate at which the digital video bit stream is normally encoded at the seamless Out Point; and, $DD_{thr\_op}$ represents a prescribed minimum decoding delay threshold for seamless Out Points, where $DD_{thr\_op}$ is defined by the following equation (2):

$$DD_{thr\_op} = ((MSR/r_{n\_op})^* SDD) - T_{p\_o}^* ((MSR/r_{n\_op})-1), \qquad (2)$$

where $T_{p\_o}$ is a time needed for displaying a picture which starts being displayed at a time of decoding of a last picture prior to the seamless Out Point; SDD is a prescribed splice decoding delay; and, MSR is a prescribed maximum splice rate.

53. A video signal, comprising:

a first digital video bit stream having a seamless In Point constructed in accordance with a constraint expressed by the following equation (1):

$$dd_{f\_ip} \leq \text{minimum } \{DD_{thr\_ip}, (B_d/r_{n\_ip})\},$$

where $dd_{f\_ip}$ represents an amount of time by which a first byte of the first digital video bit stream after the seamless In Point must stay in a decoder buffer before it is decoded; $B_d$ is a size of the decoder buffer; $r_{n\_ip}$ is a bit rate at which the first digital video bit stream is normally encoded at the seamless In Point; and, $DD_{thr\_ip}$ represents a prescribed minimum decoding delay threshold for seamless In Points, where $DD_{thr\_ip}$ is defined by the following equation (2):

$$DD_{thr\_ip} = ((MSR/r_{n\_ip})^* SDD) + T_{p\_i}^* (1-(MSR/r_{n\_ip}), \qquad (2)$$

where $T_{p\_i}$ is a time needed for displaying a picture which starts being displayed at a time of decoding of a last picture prior to the seamless In Point; SDD is a prescribed splice decoding delay; and, MSR is a prescribed maximum splice rate; and, a second digital video bit stream having a seamless Out Point constructed in accordance with a constraint expressed by the following equation (3):

$$DD_{thr\_op} \leq dd_{f\_op} \leq (B_d/r_{n\_op}), \qquad (3)$$

where $dd_{f\_op}$ represents an amount of time by which a first byte of the second digital video bit stream after the seamless Out Point must stay in a decoder buffer before it is decoded; $r_{n\_op}$ is a bit rate at which the second digital video bit stream is normally encoded at the seamless Out Point; and, $DD_{thr\_op}$ represents a prescribed minimum decoding delay threshold for seamless Out Points, where $DD_{thr\_op}$ is defined by the following equation (4):

$$DD_{thr\_op} = ((MSR/r_{n\_op})^* SDD) - T_{p\_o}^* ((MSR/r_{n\_op})-1), \qquad (4)$$

where $T_{p\_o}$ is a time needed for displaying a picture which starts being displayed at a time of decoding of a last picture prior to the seamless Out Point.

54. An encoder for encoding a digital video bit stream which includes a plurality of successively-encoded pictures, including:

means for constructing a seamless In Point in accordance with a constraint expressed by the following equation (1):

$$dd_{f\_ip} \leq \text{minimum } \{DD_{thr\_ip}, (B_d/r_{n\_ip})\}, \qquad (1)$$

where $dd_{f\_ip}$ represents an amount of time by which a first byte of the digital video bit stream after the seamless In Point must stay in a decoder buffer before it is decoded; $B_d$ is a size of the decoder buffer; $r_{n\_ip}$ is a bit rate at which the digital video bit stream is normally encoded at the seamless In Point; and, $DD_{thr\_ip}$ represents a prescribed minimum decoding delay threshold for seamless In Points, where $DD_{thr\_ip}$ is defined by the following equation (2):

$$DD_{thr\_ip} = ((MSR/r_{n\_ip})^* SDD) + T_{p\_i}^* (1-(MSR/r_{n\_ip}),$$

where $T_{p\_i}$ is a time needed for displaying a picture which starts being displayed at a time of decoding of a last picture prior to the seamless In Point; SDD is a prescribed splice decoding delay; and, MSR is a prescribed maximum splice rate; and, means for inserting the seamless In Point at a first point in the digital video bit stream at which another digital video bit stream can be spliced into the digital video bit stream.

55. The encoder as set forth in claim 54, further including:

means for determining if $MSR > r_{n\_ip}$; and, means for selecting $dd_{f\_ip}$ to have a value $\leq SDD$ if it is determined that MSR is greater than $r_{n\_ip}$, and for selecting $dd_{f\_ip}$ to have a value $dd_{r\_ip}$ defined by the following equation (3) if it is determined that MSR is not greater than $r_{n\_ip}$;

$$dd_{r\_ip} = (MSR/r_{n\_ip})^* SDD \qquad (3).$$

56. The encoder as set forth in claim 54, wherein $r_{n\_ip} > MSR$.

57. The encoder as set forth in claim 54, further including means for selecting $dd_{f\_ip}$ to have a value $dd_{r\_ip}$ defined by the following equation (3):

$$dd_{r\_ip} = (MSR/r_{n\_ip})^* SDD \qquad (3).$$

58. The encoder as set forth in claim 54, wherein MSR and SDD are selected to have values that satisfy a constraint expressed by the following equation (4):

$$MSR^*SDD < B_d \qquad (4).$$

59. An encoder for encoding a digital video bit stream which includes a plurality of successively-encoded pictures, including:

means for constructing a seamless Out Point in accordance with a constraint expressed by the following equation (1):

$$DD_{thr\_op} < dd_{f\_op} < (B_d/r_{n\_op}), \quad (1)$$

where $dd_{f\_op}$ represents an amount of time by which a first byte of the digital video bit stream after the seamless Out Point must stay in a decoder buffer before it is decoded; $r_{n\_op}$ is a bit rate of which the digital video bit stream is normally encoded at the seamless Out Point; $B_d$ is a size of the decoder buffer; and, $DD_{thr\_op}$ represents a prescribed minimum decoding delay threshold for seamless Out Points, where $DD_{thr\_op}$ is defined by the following equation (2):

$$DD_{thr\_op} = ((MSR/r_{n\_op})*SDD) - T_{p\_o}*(MSR/r_{n\_op})-1), \quad (2)$$

where $T_{p\_o}$ is a time needed for displaying a picture which starts being displayed at a time of decoding of a last picture prior to the seamless Out Point; SDD is a prescribed splice decoding delay; and, MSR is a prescribed maximum splice rate; and, means for inserting the seamless Out Point at a first point in the digital video bit stream at which it can be spliced into another digital video bit stream.

60. The encoder as set forth in claim 59, further including:

means for determining if $MSR > r_{n\_op}$; and, means for selecting $dd_{f\_op}$ to have a value $\geq SDD$ if it is determined that MSR is not greater than $r_{n\_op}$, within a constraint that $dd_{f\_op}*r_{n\_op} < B_d$; and, for selecting $dd_{f\_op}$ to have a value $dd_{r\_op}$ defined by the following equation (3) if it is determined that MSR is greater than $r_{nop}$ $$dd_{r\_op} = (MSR/r_{n\_op})*SDD \quad (3).$$

61. The encoder as set forth in claim 59, wherein $r_{n\_op} < MSR$.

62. The encoder as set forth in claim 59, wherein $dd_{f\_op}$ is selected to have a value $dd_{r\_op}$ defined by the following equation (3):

$$ddr\_op = (MSR/r_{n\_op})*SDD \quad (3).$$

63. The encoder as set forth in claim 59, wherein MSR and SDD are selected to have values that satisfy a constraint expressed by the following equation (4):

$$MSR*SDD < B_d \quad (4).$$

64. A splicer for splicing a first digital video bit stream at an Out Point into a second digital video bit stream at an In Point, the splicer including:

means for measuring $dd_{f\_op}$ and for measuring $dd_{f\_ip}$;

means for computing a difference W equal to $dd_{f\_op} - dd_{f\_ip}$; and, means for switching from the Out Point, and, after switching from the Out Point, waiting an amount of time equal to W, and then switching into the In Point;

wherein $dd_{f\_ip}$ represents an amount of time by which a first byte of the second digital video bit stream after the In Point must stay in a decoder buffer before it is decoded, and $dd_{f\_op}$ represents an amount of time by which a first byte of the first digital video bit stream after the Out Point must stay in the decoder buffer before it is decoded.

65. The splicer as set forth in claim 64, wherein the Out Point is constructed by:

constructing the Out Point in accordance with a constraint expressed by the following equation (1):

$$DD_{thr\_op} < dd_{f\_op} < (B_d/r_{n\_op}), \quad (1)$$

where $B_d$ is a size of the decoder buffer; $r_{n\_op}$ is a bit rate at which the first digital video bit stream is normally encoded at the Out Point; and, $DD_{thr\_op}$ represents a prescribed minimum decoding delay threshold for Out Points defined by the following equation (2):

$$DD_{thr\_op} = ((MSR/r_{n\_op})*SDD) - T_{p\_o}*)MSR/r_{n\_op})-1),$$

where $T_{p\_o}$ is a time needed for displaying a picture which starts being displayed at a time of decoding of a last picture prior to the Out Point; SDD is a prescribed splice decoding delay; and, MSR is a prescribed maximum splice rate; and, inserting the Out Point at a first point in the first digital video bit stream at which it can be spliced into another digital video bit stream.

66. The splicer as set forth in claim 64, wherein the In Point is constructed by:

constructing the In Point in accordance with a constraint expressed by the following equation (1):

$$dd_{f\_ip} < \text{miminum } \{DD_{thr\_ip}, (B_d/r_{ip})\}, \quad (1)$$

where $B_d$ is a size of the decoder buffer; $r_{n\_ip}$ is a bit rate at which the second digital video bit stream is normally encoded at the In Point; and, $DD_{thr\_ip}$ represents a prescribed minimum decoding delay threshold for In Points defined by the following equation (2):

$$DD_{thr\_ip} = ((MSR/r_{n\_ip})*SDD) - T_{p\_i}*(1-MSR/r_{n\_ip}), \quad (2)$$

where $T_{p\_i}$ is a time needed for displaying a picture which starts being displayed at a time of decoding of a last picture prior to the In Point; SDD is a prescribed splice decoding delay; and, MSR is a prescribed maximum splice rate; and, inserting the In Point at a first point in the second digital video bit stream at which it can be spliced into another digital video bit stream.

67. The splicer as set forth in claim 65, wherein the In Point is constructed by:

constructing the In Point in accordance with a constraint expressed by the following equation (1)

$$dd_{f\_ip} < \text{miminum } \{DD_{thr\_ip}, (B_d/r_{n\_ip})\}, \quad (1)$$

where $r_{n\_ip}$ is a bit rate at which the second digital vide obit stream is normally encoded at the In Point; and, $DD_{thr\_ip}$ represents a prescribed minimum decoding delay threshold for In Points defined by the following equation (2):

$$DD_{thr\_ip} = ((MSR/r_{n\_ip})*SDD) - T_{p\_i}*(1-MSR/r_{n\_ip}), \quad (2)$$

where $T_{p\_i}$ is a time needed for displaying a picture which starts being displayed at a time of decoding of a last picture prior to the In Point; and, inserting the In Point at a first point in the second digital video bit stream at which it can be spliced into another digital video bit stream.

68. The splicer as set forth in claim 64, wherein the In Point is a seamless In Point and the Out Point is a non-seamless Out Point, whereby the switching is seamless if the following two constraints are satisfied:

a) $dd_{f\_op} > dd_{f\_ip}$; and, b) $r_{n\_op} > r_{n\_ip}$;

wherein $r_{n\_op}$ is a bit rate at which the first digital video bit stream is normally encoded at the Out Point; and, $r_{n\_ip}$ is a bit rate at which the second digital video bit stream is normally encoded at the In Point.

69. The splicer as set forth in claim 64, wherein the In Point is a non-seamless In Point and the Out Point is a non-seamless Out Point, whereby the switching is seamless if the following two constraints are satisfied:
 a) $dd_{f\_op} > dd_{f\_ip}$; and,
 b) $r_{n\_op} > r_{n\_ip}$;
wherein $r_{n\_op}$ is a bit rate at which the first digital video bit stream is normally encoded at the Out Point; and, $r_{n\_ip}$ is a bit rate at which the second digital video bit stream is normally encoded at the In Point.

70. The splicer as set forth in claim 64, wherein the In Point is a non-seamless In Point and the Out Point is a seamless Out Point, whereby the switching is seamless if the following two constraints are satisfied:
 a) $dd_{f\_op} > dd_{f\_ip}$; and,
 b) $r_{n\_op} > r_{n\_ip}$;
wherein $r_{n\_op}$ is a bit rate at which the first digital video bit stream is normally encoded at the Out Point; and, $r_{n\_ip}$ is a bit rate at which the second digital video bit stream is normally encoded at the In Point.

71. A splicer for splicing a first digital video bit stream at an Out Point into a second digital video bit stream at an In Point, the splicer including:
 means for measuring $dd_{f\_op}$ and for measuring $dd_{f\_ip}$;
 means for computing a difference W equal to $dd_{f\_op} - dd_{f\_ip}$;
 means for switching from the Out Point; and,
 means for streaming the second digital video bit stream at a first rate $R_2 \leq r_{n\_op}$ for a first time period having a duration equal to W, and, for then streaming the second digital video bit stream for a second time period having a duration $dd'_{f\_ip}$ at a second rate $R_{sp\_in}$ defined by the following equation:

$$R_{sp\_in} = ((r_{n\_ip} * dd'_{f\_ip}) - (R_w * W))/dd'_{f\_ip},$$

where $dd'_{f\_ip} = dd_{f\_ip} - T_{p\_o}$; $T_{p\_o}$ is a time needed for displaying a picture which starts being displayed at a time of decoding of a last picture prior to the Out Point; $dd_{f\_ip}$ represents an amount of time by which a first byte of the second digital video bit stream after the In Point must stay in a decoder buffer before it is decoded; $dd_{f\_op}$ represents an amount of time by which a first byte of the first digital video bit stream after the Out Point must stay in the decoder buffer before it is decoded; $r_{n\_ip}$ is a bit rate at which the second digital video bit stream is normally encoded at the In Point; and, $r_{n\_op}$ is a bit rate at which the first digital video bit stream is normally encoded at the Out Point.

72. The splicer as set forth in claim 71, wherein the Out Point is constructed by:
 constructing the Out Point in accordance with a constraint expressed by the following equation (1):

$$DD_{thr\_op} < dd_{f\_op} < (B_d/r_{n\_op}), \qquad (1)$$

where $B_d$ is a size of the decoder buffer; and, $DD_{thr\_op}$ represents a prescribed minimum decoding delay threshold for Out Points defined by the following equation (2):

$$DD_{thr\_op} = ((MSR/r_{n\_op}) * SDD) - T_{p\_o} * (MSR/r_{n\_op}) - 1), \qquad (2)$$

where $T_{p\_o}$ is a time needed for displaying a picture which starts being displayed at a time of decoding of a last picture prior to the Out Point; SDD is a prescribed splice decoding delay; and, MSR is a prescribed maximum splice rate; and,
 inserting the Out Point at a first point in the first digital video bit stream at which it can be spliced into another digital video bit stream.

73. The splicer as set forth in claim 71, wherein the In Point is constructed by:
 constructing the In Point in accordance with a constraint expressed by the following equation (1):

$$dd_{f\_ip} < \text{miminum } \{DD_{thr\_ip}, (B_d/r_{n\_ip})\}, \qquad (1)$$

where $B_d$ is a size of the decoder buffer; and, $DD_{thr\_ip}$ represents a prescribed minimum decoding delay threshold for In Points defined by the following equation (2):

$$DD_{thr\_ip} = ((MSR/r_{n\_ip}) * DSS) - T_{p\_i} * (1 - MSR/r_{n\_ip}), \qquad (2)$$

where $T_{p\_i}$ is a time needed for displaying a picture which starts being displayed at a time of decoding of a last picture prior to the In Point; SDD is a prescribed splice decoding delay; and, MSR is a prescribed maximum splice rate; and,
 inserting the In Point at a first point in the second digital video bit stream at which it can be spliced into another digital video bit stream.

74. The splicer as set forth in claim 72, wherein the In Point is constructed by:
 construction the In Point in accordance with a constraint expressed by the following equation (1):

$$dd_{f\_ip} < \text{miminum } \{DD_{thr\_ip}, (B_d/r_{n\_ip})\}, \qquad (1)$$

where $DD_{thr\_ip}$ represents a prescribed minimum decoding delay threshold for In Points defined by the following equation (2):

$$DD_{thr\_ip} = ((MSR/r_{n\_ip}) * SDD) - T_{p\_i} * (1 - MSR/r_{n\_ip}), \qquad (2)$$

where $T_{p\_i}$ is a time needed for displaying a picture which starts being displayed at a time of decoding of a last picture prior to the In Point; and,
 inserting the In Point at a first point in the second digital video bit stream at which it can be spliced into another digital video bit stream.

75. The splicer as set forth in claim 71, wherein the In Point is a seamless In Point and the Out Point is a non-seamless Out Point, whereby the switching is seamless if the following two constraints are satisfied:
 a) $dd_{f\_op} > dd_{f\_ip}$; and,
 b) $r_{n\_op} > r_{n\_ip}$.

76. The splicer as set forth in claim 71, wherein the In Point is a non-seamless In Point and the Out Point is a non-seamless Out Point, whereby the switching is seamless if the following two constraints are satisfied:
 a) $dd_{f\_op} > dd_{f\_ip}$; and,
 b) $r_{n\_op} > r_{n\_ip}$.

77. The splicer as set forth in claim 71, wherein the In Point is a non-seamless In Point and the Out Point is a seamless Out Point, whereby the switching is seamless if the following two constraints are satisfied:
 a) $dd_{f\_op} > dd_{f\_ip}$; and,
 b) $r_{n\_op} > r_{n\_ip}$.

78. A splicer for splicing a first digital video bit stream at an Out Point into a second digital video bit stream at an In Point, the splicer including:
 means for measuring $dd_{f\_op}$ and for measuring $dd_{f\_ip}$;
 means for computing a difference W equal to $dd_{f\_op} - dd_{f\_ip}$, and for computing a stream bit rate $R_{sp\_op}$ according to the following equation (1):

$$R_{sp\_op} = (dd_{f\_ip}/dd_{f\_op}) * r_{n\_ip}; \qquad (1)$$

means for determining if $R_{sp\_op} \leq r_{n\_op}$;

means for switching from the Out Point;

means for streaming the second digital video bit stream at the rate $R_{sp\_op}$ for the duration of $dd_{f\_op}$, if it is determined that $R_{sp\_op} \leq rn\_op$; and, means for performing a selected one of the following two possible procedures:
  (i) waiting an amount of time equal to W, and then switching into the In Point; or,
  (ii) (A) streaming the second digital video bit stream at a first rate $R_w \leq r_{n\_op}$ for a first time period having a duration equal to W; and, (B) then streaming the second digital video bit stream for a second time period having a duration $dd'_{f\_ip}$ at a second rate $R_{sp\_in}$ defined by the following equation (2):

$$R_{sp\_in} = ((r_{n\_ip} * dd'_{f\_ip}) - (R_w * W))/dd'_{f\_ip}, \qquad (2)$$

where $dd'_{f\_ip} = dd_{f\_ip} - T_{p\_o}$,
if it is determined that $R_{sp\_op} > r_{n\_op}$; $T_{p\_o}$ is a time needed for displaying a picture which starts being displayed at a time of decoding of a last picture prior to the Out Point; $dd_{f\_ip}$ represents an amount of time by which a first byte of the second digital video bit stream after the In Point must stay in a decoder buffer before it is decoded; $dd_{f\_op}$ represents an amount of time by which a first byte of the first digital video bit stream after the Out Point must stay in the decoder buffer before it is decoded; $r_{n\_ip}$ is a bit rate at which the second digital video bit stream is normally encoded at the In Point; and, $r_{n\_op}$ is a bit rate at which the first digital video bit stream is normally encoded at the Out Point.

79. The splicer at set forth in claim 78, wherein the Out Point is constructed by:

constructing the Out Point in accordance with a constraint expressed by the following equation (1):

$$DD_{thr\_op} < dd_{f\_op} < (B_d/r_{n\_op}),$$

where $B_d$ is a size of the decoder buffer; and, $DD_{thr\_op}$ represents a prescribed minimum decoding delay threshold for Out Points defined by the following equation (2):

$$DD_{thr\_op} = (MSR/r_{n\_op}) * SDD) - T_{p\_o} * (MSR/r_{n\_op}) - 1), \qquad (2)$$

where $T_{p\_o}$ is a time needed for displaying a picture which starts being displayed at a time of decoding of a last picture prior to the Out Point; SDD is a prescribed splice decoding delay; and, MSR is a prescribed maximum splice rate; and, inserting the Out Point at a first point in the first digital video bit stream at which it can be spliced into another digital video bit stream.

80. The splicer as set forth in claim 78, wherein the In Point is constructed by:

constructing the In Point in accordance with a constraint expressed by the following equation (1):

$$dd_{f\_ip} < \text{miminum } \{DD_{thr\_ip}, (B_d/r_{n\_ip})\}, \qquad (1)$$

where $B_d$ is a size of the decoder buffer; and, $DD_{thr\_ip}$ represents a prescribed minimum decoding delay threshold for In Points defined by the following equation (2):

$$DD_{thr\_ip} = ((MSR/r_{n\_ip}) * SDD) - T_{p\_i} * (1 - MSR/r_{n\_ip}), \qquad (2)$$

where $T_{p\_i}$ is a time needed for displaying a picture which starts being displayed at a time of decoding of a last picture prior to the In Point; SDD is a prescribed splice decoding delay; and, MSR is a prescribed maximum splice rate; and, inserting the In Point at a first point in the second digital video bit stream at which it can be spliced into another digital video bit stream.

81. The splicer as set forth in claim 79, wherein the In Point is constructed by:

constructing the In Point in accordance with a constraint expressed by the following equation (1):

$$dd_{f\_ip} < \text{miminum } \{DD_{thr\_ip}, (B_d/r_{n\_ip})\}, \qquad (1)$$

where $DD_{thr\_ip}$ represents a prescribed minimum decoding delay threshold for In Points defined by the following equation (2):

$$DD_{thr\_ip} = ((MSR/r_{n\_ip}) * SDD) - T_{p\_i} * (1 - MSR/r_{n\_ip}), \qquad (2)$$

where $T_{p\_i}$ is a time needed for displaying a picture which starts being displayed at a time of decoding of a last picture prior to the In Point; and, inserting the In Point at a first point in the second digital video bit stream at which it can be spliced into another digital video bit stream.

82. The splicer as set forth in claim 78, wherein the In Point is a seamless In Point and the Out Point is a non-seamless Out Point, whereby the switching is seamless if the following two constraints are satisfied:

a) $dd_{f\_op} > dd_{f\_ip}$; and,
  b) $r_{n\_op} > r_{n\_ip}$.

83. The splicer as set forth in claim 78, wherein the In Point is a non-seamless In Point and the Out Point is a non-seamless Out Point, whereby the switching is seamless if the following two constraints are satisfied:

a) $dd_{f\_op} > dd_{f\_ip}$; and,
  b) $r_{n\_op} > r_{n\_ip}$.

84. The splicer as set forth in claim 78, wherein the In Point is a non-seamless In Point and the Out Point is a seamless Out Point, whereby the switching is seamless if the following two constraints are satisfied:

a) $dd_{f\_op} > dd_{f\_ip}$; and,
  b) $r_{n\_op} > r_{n\_ip}$.

* * * * *